(12) United States Patent
Furuhata et al.

(10) Patent No.: US 10,032,544 B2
(45) Date of Patent: Jul. 24, 2018

(54) TERMINAL TREATMENT APPARATUS FOR A COAXIAL CABLE TO SEPARATE A SHEATH FROM A CONDUCTOR

(71) Applicant: Yazaki Corporation, Minato-ku, Tokyo (JP)

(72) Inventors: Kenta Furuhata, Makinohara (JP); Yasutsugu Shiraki, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 192 days.

(21) Appl. No.: 15/076,848

(22) Filed: Mar. 22, 2016

(65) Prior Publication Data

US 2016/0203889 A1 Jul. 14, 2016

Related U.S. Application Data

(62) Division of application No. 13/868,522, filed on Apr. 23, 2013, now Pat. No. 9,368,259.

(30) Foreign Application Priority Data

Apr. 27, 2012 (JP) ................................. 2012-104017

(51) Int. Cl.
   *H02G 1/12* (2006.01)
   *H01B 13/016* (2006.01)

(52) U.S. Cl.
   CPC ....... *H01B 13/0167* (2013.01); *H02G 1/1256* (2013.01); *H02G 1/1292* (2013.01); *Y10T 29/49123* (2015.01)

(58) Field of Classification Search
   CPC ............. H01B 13/0167; H02G 1/1256; H02G 1/1292; Y10T 29/49123
   See application file for complete search history.

(56) References Cited

U.S. PATENT DOCUMENTS 3,828,305 A    8/1974  Hogendobler
4,719,697 A    1/1988  Schwartzman et al.
(Continued)

FOREIGN PATENT DOCUMENTS

DE   10 2005 024 683 A1   12/2006
EP       1 054 494 A2     11/2000
(Continued)

OTHER PUBLICATIONS

Search Report, Issued by the State Intellectual Property Office of P.R. China, dated Feb. 12, 2015, In counterpart Chinese Application No. 201310150650.X.
(Continued)

*Primary Examiner* — Minh Trinh
(74) *Attorney, Agent, or Firm* — Sughrue Mion, PLLC

(57) ABSTRACT

A terminal treatment apparatus for a coaxial cable including a core member having an inner conductor covered with an insulator, an outer conductor provided around the core member and formed of a plurality of wires, and a sheath covering an outer circumference of the outer conductor, includes a widening terminal to widen the outer conductor away from the core member by compressing a terminal-near portion of the exposed outer conductor from an outer circumferential side of the coaxial cable to deform the terminal-near portion of the exposed outer conductor.

2 Claims, 13 Drawing Sheets

(56) References Cited

U.S. PATENT DOCUMENTS

| | | | |
|---|---|---|---|
| 5,058,260 A * | 10/1991 | Gloe | H01R 43/05 29/564.4 |
| 5,867,896 A | 2/1999 | Watanabe | |
| 6,243,947 B1 * | 6/2001 | Fujita | H02G 1/1256 29/33 F |
| 6,363,604 B1 * | 4/2002 | Sakuma | H02G 1/1256 29/564.4 |
| 9,368,259 B2 * | 6/2016 | Furuhata | H01B 13/0167 |
| 2002/0121185 A1 | 9/2002 | Yamakawa | |
| 2004/0099427 A1 | 5/2004 | Kihira | |
| 2005/0181672 A1 | 8/2005 | Matsuoka | |
| 2007/0173122 A1 | 7/2007 | Matsuoka | |
| 2008/0313892 A1 | 12/2008 | Baldauf | |
| 2011/0239451 A1 | 10/2011 | Montena et al. | |
| 2013/0283605 A1 * | 10/2013 | Furuhata | H02G 1/1256 29/828 |
| 2013/0283612 A1 | 10/2013 | Furuhata et al. | |

FOREIGN PATENT DOCUMENTS

| | | |
|---|---|---|
| JP | 64-81608 A | 3/1989 |
| JP | 2002262429 A | 9/2002 |
| JP | 2004-171952 A | 6/2004 |
| JP | 2007-66825 A | 3/2007 |
| JP | 2007202303 A | 8/2007 |
| TW | I307195 | 1/2009 |

OTHER PUBLICATIONS

Office Action dated Dec. 1, 2015 by the Japanese Patent Office in counterpart Japanese Application No. 2012-104017.

Office Action dated Nov. 4, 2015, issued by the State Intellectual Property Office of P.R. China in counterpart Chinese Application No. 201310150650.X.

Office Action dated Jan. 21, 2014, issued by the German Patent Office in counterpart German Application No. 10 2013 206 804.2.

* cited by examiner

TERMINAL TREATMENT APPARATUS FOR A COAXIAL CABLE TO SEPARATE A SHEATH FROM A CONDUCTOR

CROSS REFERENCE TO RELATED APPLICATIONS

This application is a Divisional of U.S. application Ser. No. 13/868,522, filed on Apr. 23, 2013, now U.S. Pat. No. 9,368,259, issued Jun. 14, 2016 and claims the priority of Japanese Patent Application No. 2012-104017 filed on Apr. 27, 2012, the contents of which are incorporated herein by reference in their entireties.

BACKGROUND OF THE INVENTION

1. Technical Field

The present invention relates to a terminal treatment method and a terminal treatment apparatus for a coaxial cable having an inner conductor and an outer conductor.

2. Background Art

As electric cables having a shielding function, coaxial cables having an outer conductor covering an outer circumference of an inner conductor have been used from the past (for example, see JP-A-2004-171952 and JP-A-2007-066825).

Also, a technique for terminal-treating such coaxial cables, in which an inner conductor in a terminal portion thereof is separated from an outer conductor, has been known (for example, see JP-A-H1-081608).

When, for example, an outer conductor is to be separated in a terminal portion of a coaxial cable, or the like, radially outwardly widening an end portion of the exposed outer conductor is performed as a pre-treatment.

However, because the outer conductor is wound in a spiral pattern or is attached in a longitudinal direction thereof on an outer circumference of a core member having an inner conductor covered with an insulator, it is difficult to easily widen the end portion of the outer conductor.

In addition, there is a case that a coaxial cable, in which an outer conductor disposed on an outer circumference of a core member is intended to be used as a lead like an inner conductor, not as a shielding use, is employed for a wire harness wired in a vehicle, such as an automobile. For the coaxial cable used as this application, because the outer conductor does not have a small diameter as in the shielding use, it is further difficult to widen the end portion of the outer conductor.

Accordingly, the present invention has been made keeping in mind the above problems, and an object of the invention is to provide a terminal treatment method and a terminal treatment apparatus for a coaxial cable, in which an end portion of an outer conductor can be easily widened.

SUMMARY OF THE INVENTION

To achieve the above object, a terminal treatment method for a coaxial cable according to the present invention is characterized by the following (1).

(1) A terminal treatment method for a coaxial cable including a core member having an inner conductor covered with an insulator, an outer conductor provided around the core member and formed of a plurality of wires, and a sheath covering an outer circumference of the outer conductor, includes exposing the outer conductor by removing the sheath on an end portion of the outer conducter, and widening a terminal of the outer conductor away from the core member by compressing a terminal-near portion of the exposed outer conductor from an outer circumferential side of the coaxial cable to deform the terminal-near portion of the exposed outer conductor.

According to the terminal treatment method for the coaxial cable of (1), the terminal-near portion of the outer conductor is deformed by compression from the outer circumferential side thereof, so that the terminal portion of the outer conductor can be very easily widened away from the core member. Therefore, enhancement of workability of subsequent treatments for the coaxial cable can be achieved.

Also, to achieve the above object, a terminal treatment apparatus for a coaxial cable according to the present invention is characterized by the following (2) or (3).

(2) A terminal treatment apparatus for a coaxial cable including a core member having an inner conductor covered with an insulator, an outer conductor provided around the core member and formed of a plurality of wires, and a sheath covering an outer circumference of the outer conductor, includes a terminal widening jig that widens a terminal of the outer conductor away from the core member by compressing a terminal-near portion of the exposed outer conductor from an outer circumferential side of the coaxial cable to deform the terminal-near portion of the exposed outer conductor.

(3) The terminal treatment apparatus for the coaxial cable according to the above configuration (2) further includes a pair of shaping blocks separably contacts with each other and has a groove formed on a side facing each other. When the shaping blocks become close to each other, a holding hole of a right hexagonal shape or a right octagonal shape is formed by the grooves. When the terminal-near portion of the outer conductor is disposed in the holding hole and then the shaping blocks become close to each other, the holding hole is shrunk and the terminal-near portion of the outer conductor is compressed.

According to the terminal treatment apparatus for the coaxial cable of (2), the terminal-near portion of the outer conductor is deformed by compression from the outer circumferential side thereof by the terminal widening jig so that the terminal portion of the outer conductor can be widened away from the core member. Therefore, enhancement of workability of subsequent treatments for the coaxial cable can be achieved.

According to the terminal treatment apparatus for the coaxial cable of (3), as the shaping blocks become close to each other, the holding hole of a right hexagonal shape or a right octagonal shape formed by the grooves is shrunk. Thus, when the terminal-near portion of the outer conductor is disposed in the holding hole, the outer circumference of the terminal-near portion of the outer conductor can be substantially uniformly compressed so that the end portion of the outer conductor can be uniformly widened in a concentric circle shape. Therefore, workability of subsequent treatments for the coaxial cable can be further enhanced.

According to the present invention, a terminal treatment method and a terminal treatment apparatus for a coaxial cable, in which an end portion of an outer conductor can be easily widened, can be provided.

In the foregoing, the present invention has been briefly described. Also, details of the present invention will be further apparent, when modes (hereinafter, referred to as "embodiments") for embodying the invention as described below are thoroughly read with reference to the accompanying drawings.

BRIEF DESCRIPTION OF DRAWINGS

FIGS. 1A and 1B are views showing a coaxial cable of which a terminal is to be treated by a terminal treatment method and a terminal treatment apparatus for a coaxial cable according to the present invention, in which FIG. 1A is a perspective view of an end portion thereof and FIG. 1B is a sectional view of the end portion.

DESCRIPTION OF EMBODIMENTS

An exemplary embodiment according to the present invention will be now described with reference to the accompanying drawings.

In the present embodiment, branching a core member and an outer conductor of a coaxial cable from each other will be described by way of example.

Figure 1A:
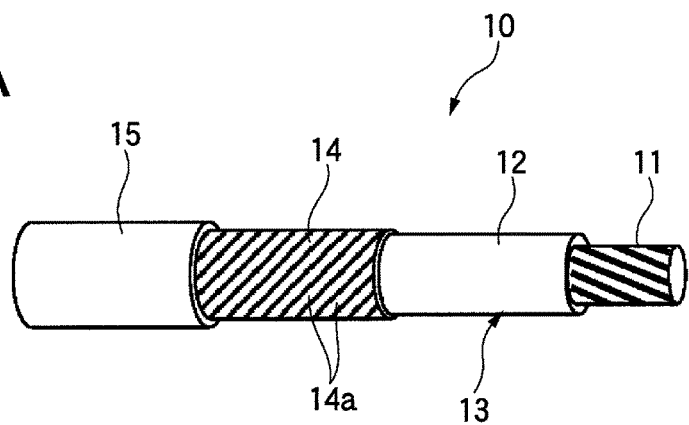
Figure 1B:
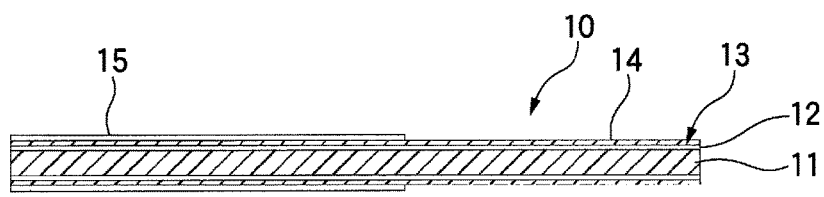
Figure 2:
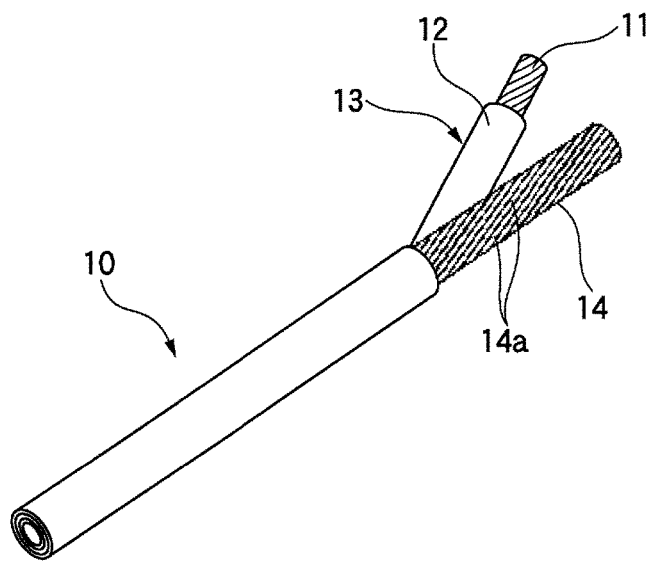
FIG. 2 is a perspective view of the end portion of the coaxial cable of which the terminal has been treated.

FIGS. 1A and 1B are views showing a coaxial cable of which a terminal is to be treated by a terminal treatment method and a terminal treatment apparatus for a coaxial cable according to the present invention, in which FIG. 1A is a perspective view of an end portion thereof and FIG. 1B is a sectional view of the end portion, and FIG. 2 is a perspective view of the end portion of the coaxial cable of which the terminal has been treated.

As shown in FIGS. 1A and 1B, a coaxial cable 10, of which a terminal is to be treated by the terminal treatment method and the terminal treatment apparatus according to the present invention, has a structure in which a core member 13 having an inner conductor 11 covered with an insulator 12 is provided at the center thereof, an outer conductor 14 is provided around the core member 13 and a sheath 15 also covers an outer circumference of the outer conductor 14.

The inner conductor 11 is, for example, a intertwined wire made of a plurality of copper wires or a single wire made of one copper wire. The insulator 12 is formed by an insulation material made of a synthetic resin. The outer conductor 14 is formed by winding a plurality of wires 14a, such as copper wires, in one direction in a spiral pattern. The sheath 15 is formed by an insulation material made of a synthetic resin.

The coaxial cable 10 is a cable in which the outer conductor 14 is intended to be used as a lead like the inner conductor 11, not as a shielding use, and is used as a wire harness wired in a vehicle, such as an automobile. As this outer conductor 14 of the coaxial cable 10, wires thicker than wires of a small diameter, such as an outer conductor for shielding, are used.

In the terminal treatment method and the terminal treatment apparatus according to the present embodiment, as shown in FIG. 2, the coaxial cable 10 is terminal-treated to become a state in which the sheath 15 on an end portion thereof has been removed and then the core member 13 having the inner conductor 11 covered with the insulator 12 have been branched from the outer conductor 14. By terminal-treating in this way, the inner conductor 11 can be exposed from an end portion of the core member 13, and then the inner conductor 11 and the outer conductor 14 from which the core member 13 has been branched can be connected to a connector or the like.

Hereinafter, the terminal treatment method and the terminal treatment apparatus according to the present embodiment will be described in detail with respect to each of steps thereof.

Figure 3:
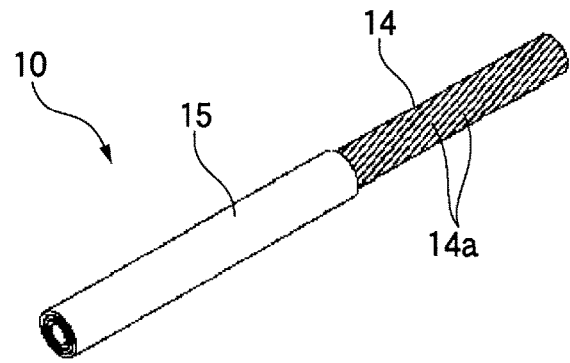
FIG. 3 is a perspective view of the end portion of the coaxial cable explaining an outer conductor exposing step.
Figure 4:
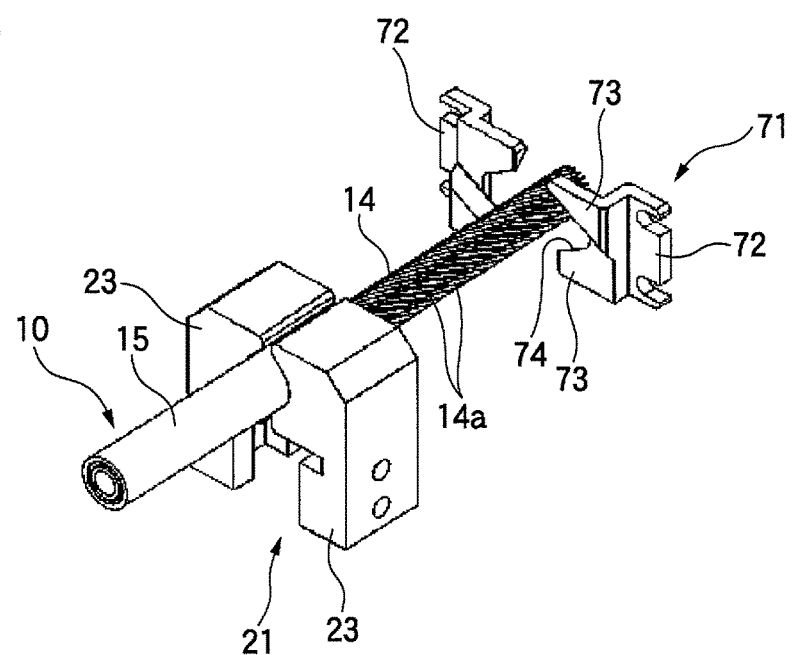
FIG. 4 is a perspective view of the end portion of the coaxial cable explaining an outer conductor terminal widening step.
Figure 5:
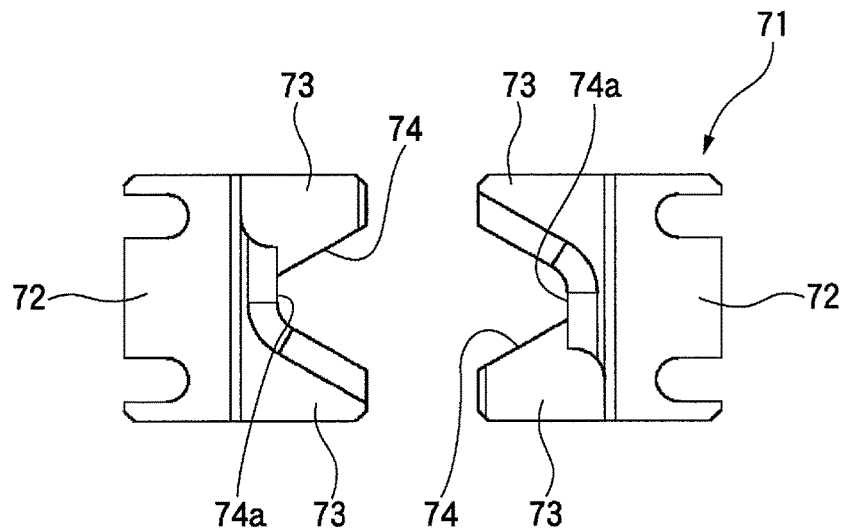
FIG. 5 is a front view of a terminal widening jig explaining the terminal widening jig.
Figure 6:
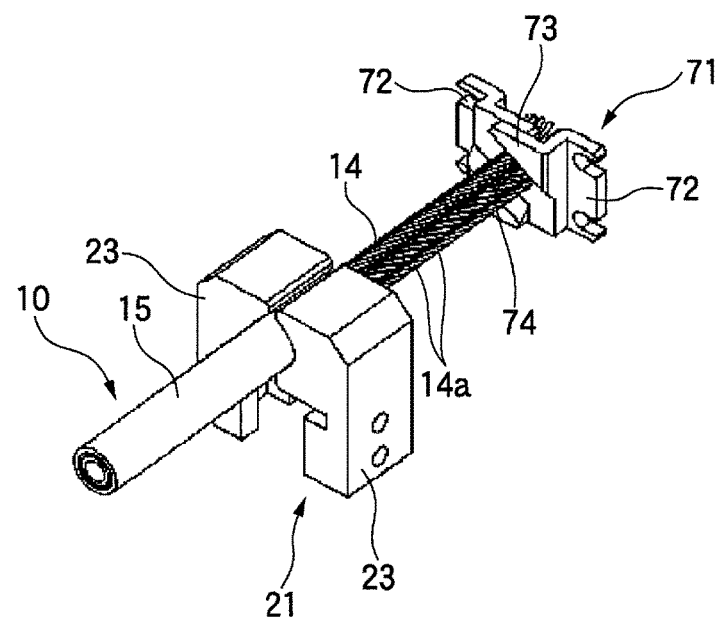
FIG. 6 is a perspective view of the end portion of the coaxial cable explaining an outer conductor terminal widening step.
Figure 7:
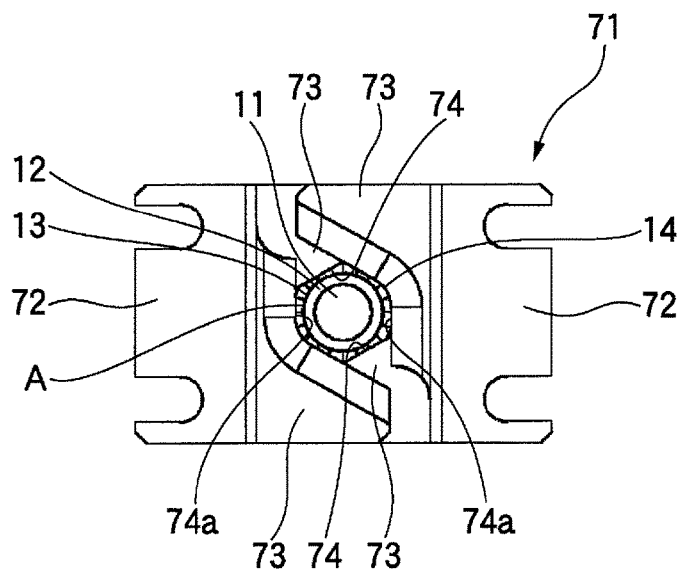
FIG. 7 is a front view of the terminal widening jig explaining widening of the outer conductor.
Figure 8A:
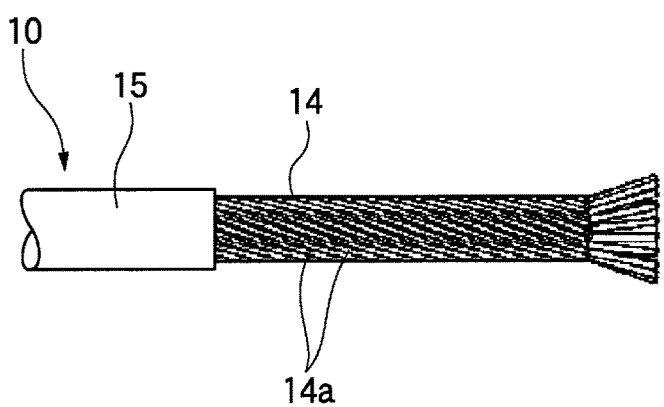
FIGS. 8A and 8B are a side view and a front view of the end portion of the coaxial cable of which the terminal portion of the outer conductor has been widened.
Figure 8B:
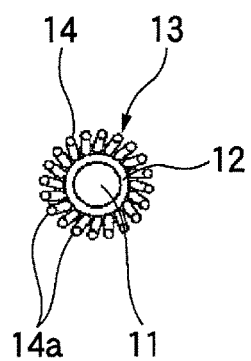
Figure 9:
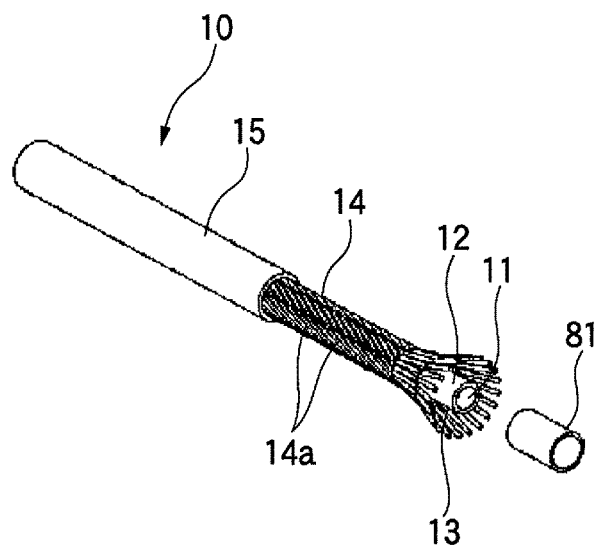
FIG. 9 is a perspective view of the end portion of the coaxial cable explaining a core mounting step.
Figure 10:
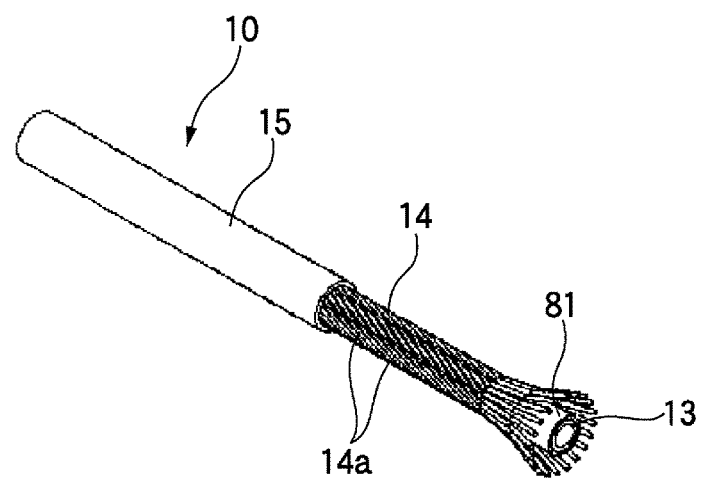
FIG. 10 is a perspective view of the end portion of the coaxial cable explaining a core mounting step.
Figure 11:
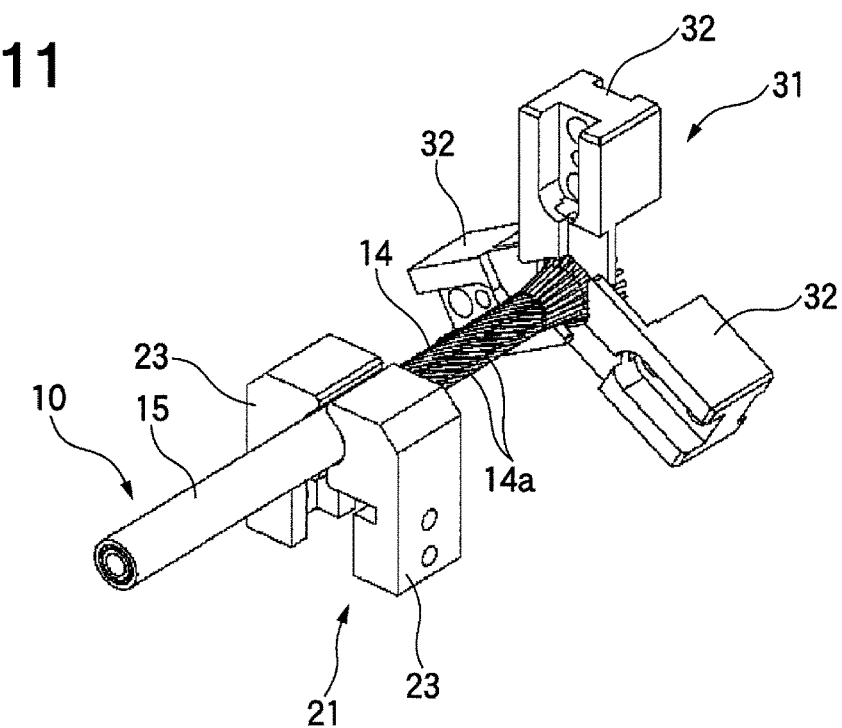
FIG. 11 is a perspective view of the end portion of the coaxial cable explaining an outer conductor releasing step.
Figure 12:
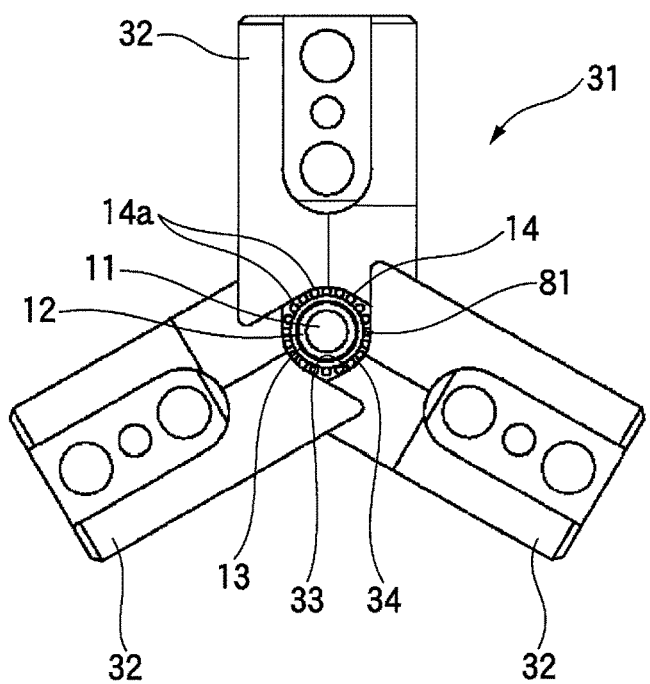
FIG. 12 is a front view of a chuck jig explaining a state of chucking the coaxial cable by the chuck jig.
Figure 13:
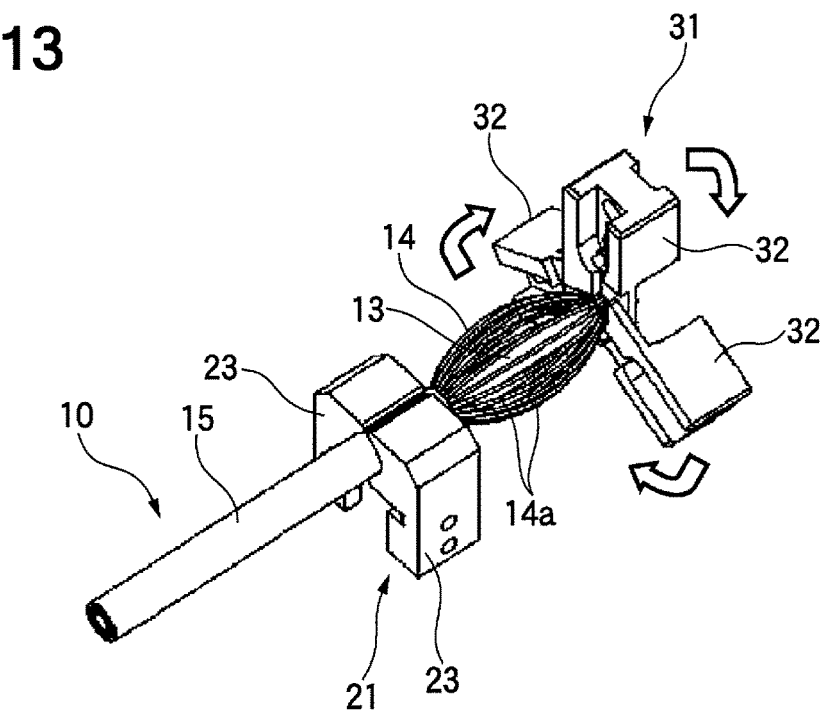
FIG. 13 is a perspective view of the end portion of the coaxial cable explaining an outer conductor releasing step.
Figure 14:
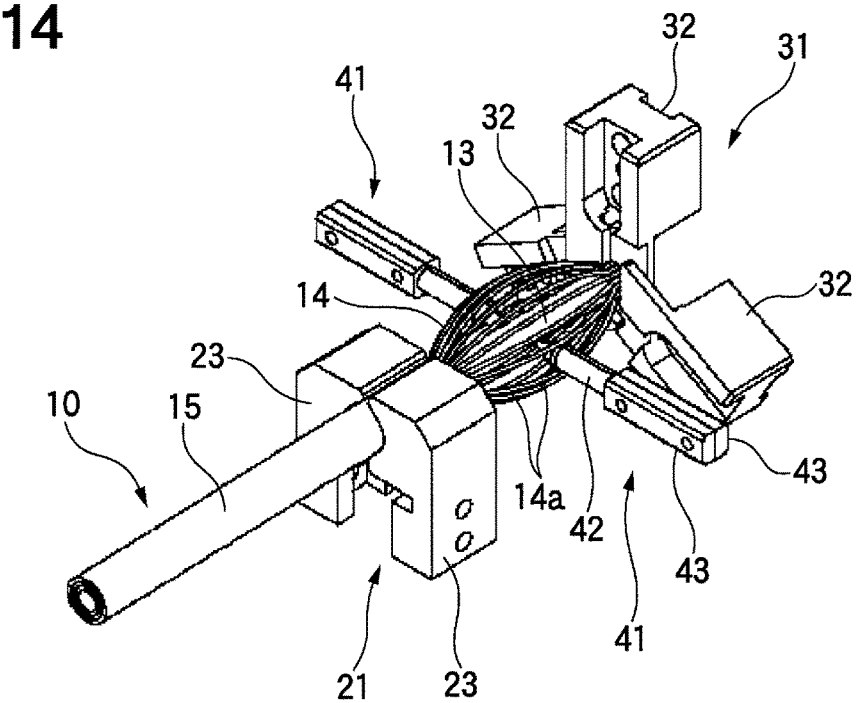
FIG. 14 is a perspective view of the end portion of the coaxial cable explaining an outer conductor splitting step.
Figure 15:
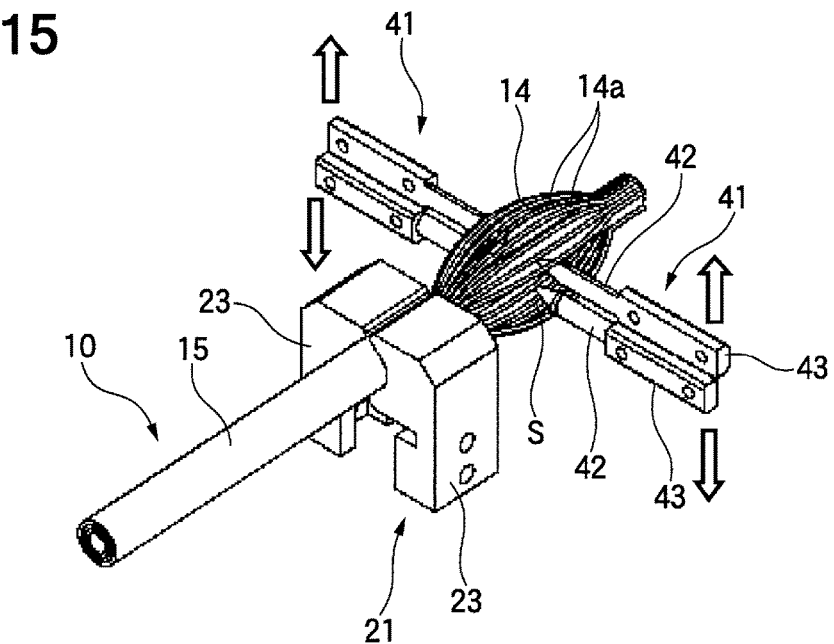
FIG. 15 is a perspective view of the end portion of the coaxial cable explaining an outer conductor splitting step.
Figure 16:
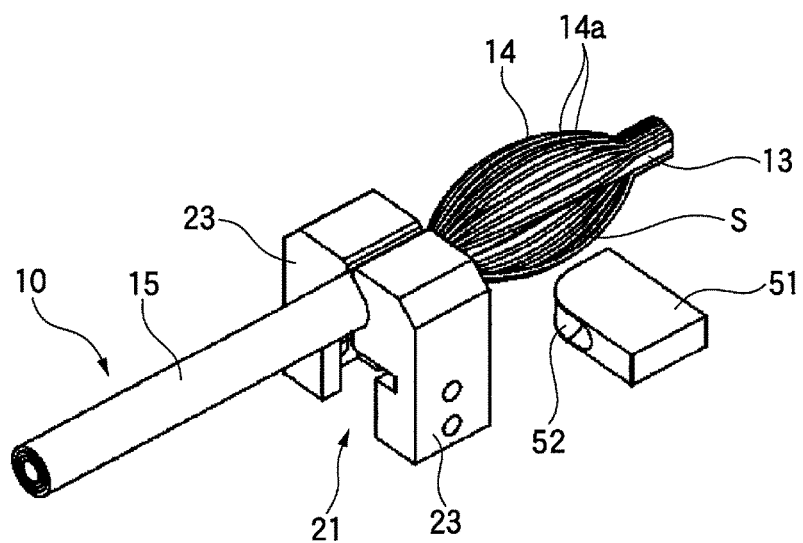
FIG. 16 is a perspective view of the end portion of the coaxial cable explaining an inner conductor extracting step.
Figure 17:
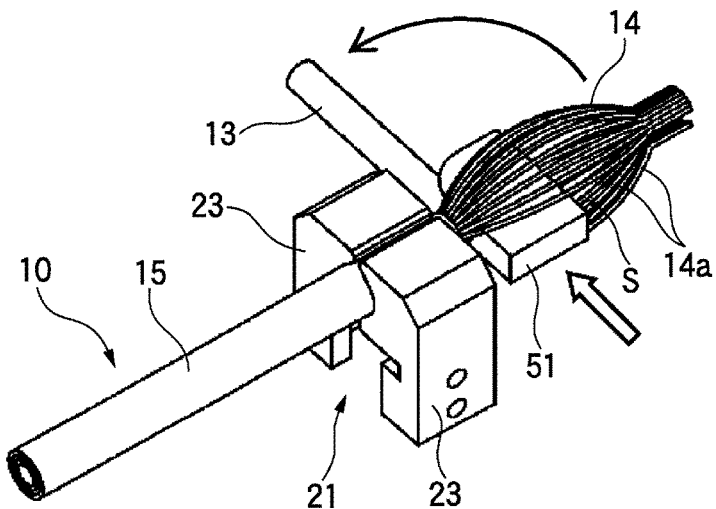
FIG. 17 is a perspective view of the end portion of the coaxial cable explaining an inner conductor extracting step.
Figure 18:
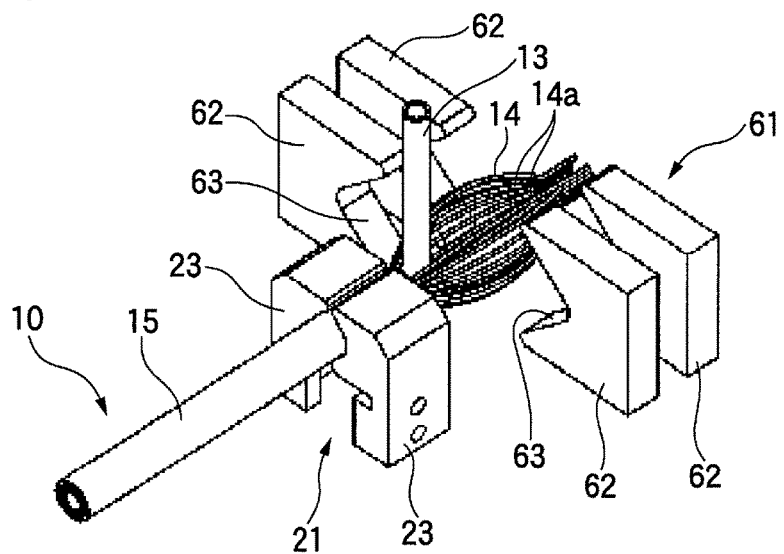
FIG. 18 is a perspective view of the end portion of the coaxial cable explaining an outer conductor converging step.
Figure 19:
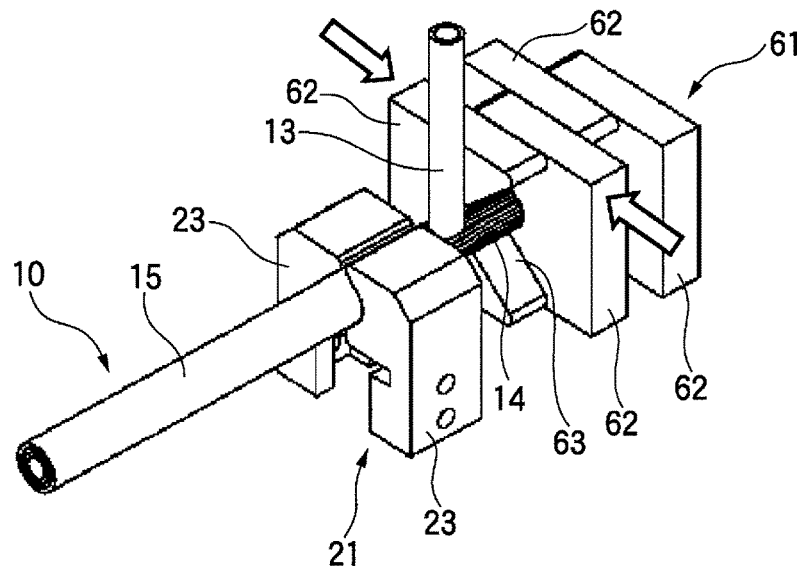
FIG. 19 is a perspective view of the end portion of the coaxial cable explaining an outer conductor converging step.
Figure 20:
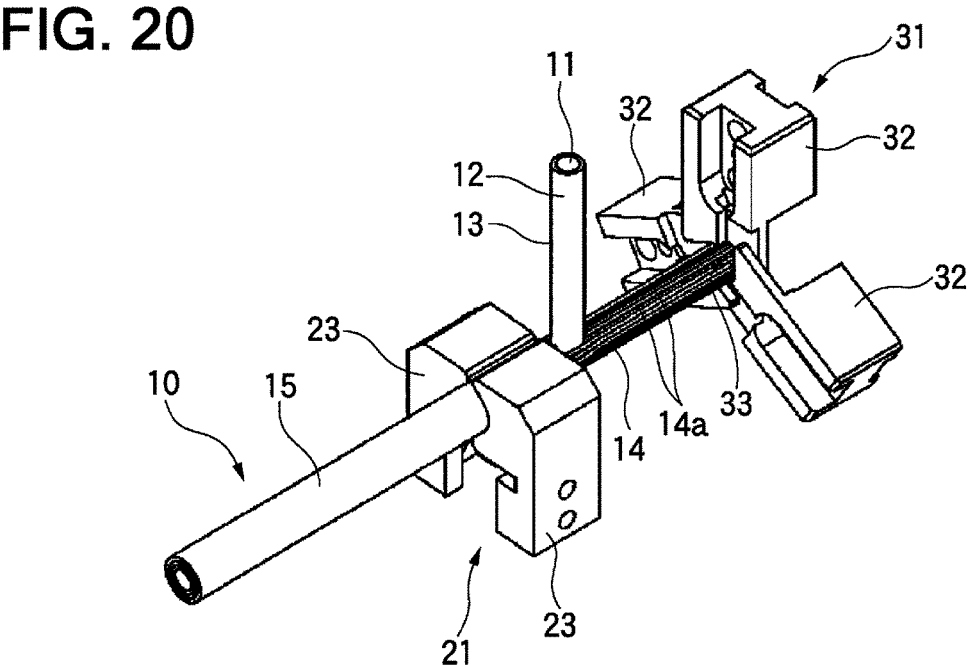
FIG. 20 is a perspective view of the end portion of the coaxial cable explaining an outer conductor intertwining step.
Figure 21:
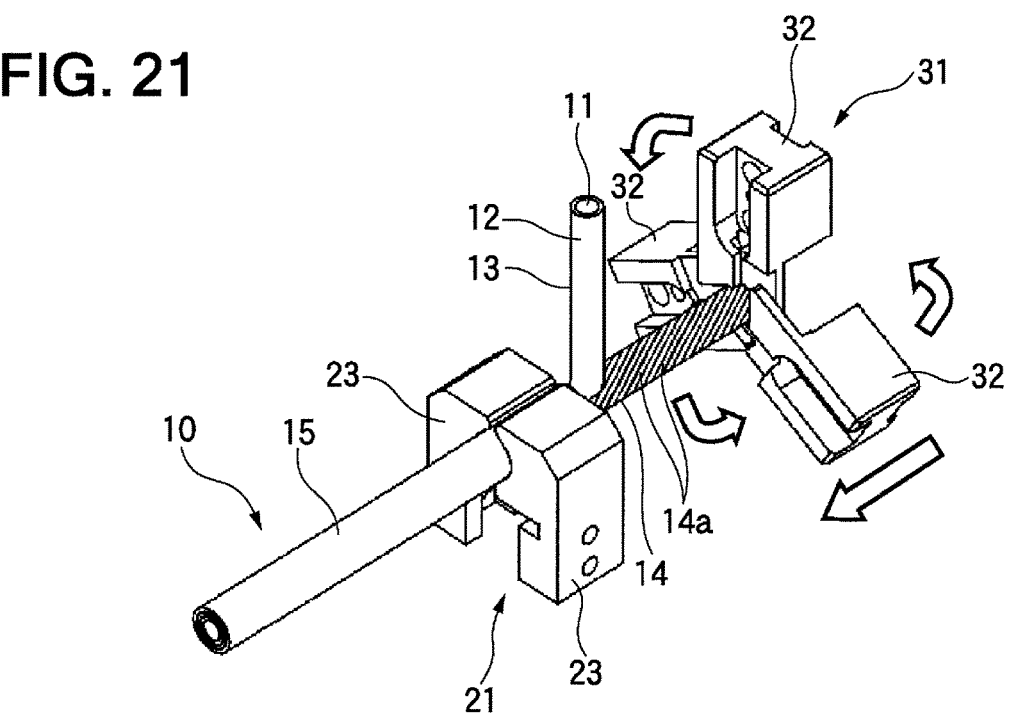
FIG. 21 is a perspective view of the end portion of the coaxial cable explaining an outer conductor intertwining step.
Figure 22:
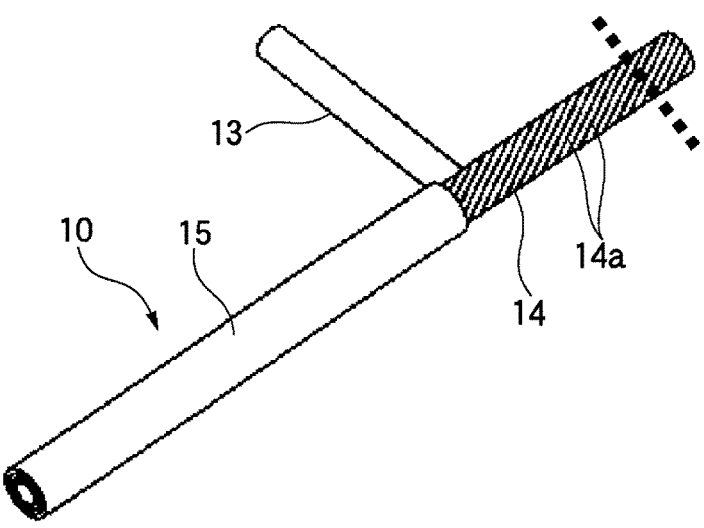
FIG. 22 is a perspective view of the end portion of the coaxial cable explaining an outer conductor terminal trimming step.

FIG. 3 is a perspective view of the end portion of the coaxial cable explaining an outer conductor exposing step, FIG. 4 is a perspective view of the end portion of the coaxial cable explaining an outer conductor terminal widening step, FIG. 5 is a front view of a terminal widening jig explaining the terminal widening jig, FIG. 6 is a perspective view of the end portion of the coaxial cable explaining an outer conductor terminal widening step, FIG. 7 is a front view of the terminal widening jig explaining widening of the outer conductor, FIGS. 8A and 8B are a side view and a front view of the end portion of the coaxial cable of which the terminal portion of the outer conductor has been widened, FIG. 9 is a perspective view of the end portion of the coaxial cable explaining a core mounting step, FIG. 10 is a perspective view of the end portion of the coaxial cable explaining a core mounting step, FIG. 11 is a perspective view of the end portion of the coaxial cable explaining an outer conductor releasing step, FIG. 12 is a front view of a chuck jig explaining a state of chucking the coaxial cable by the chuck jig, FIG. 13 is a perspective view of the end portion of the coaxial cable explaining an outer conductor releasing step, FIG. 14 is a perspective view of the end portion of the coaxial cable explaining an outer conductor splitting step, FIG. 15 is a perspective view of the end portion of the coaxial cable explaining an outer conductor splitting step, FIG. 16 is a perspective view of the end portion of the coaxial cable explaining an inner conductor extracting step, FIG. 17 is a perspective view of the end portion of the coaxial cable explaining an inner conductor extracting step, FIG. 18 is a perspective view of the end portion of the coaxial cable explaining an outer conductor converging step, FIG. 19 is a perspective view of the end portion of the coaxial cable explaining an outer conductor converging step, FIG. 20 is a perspective view of the end portion of the coaxial cable explaining an outer conductor intertwining step, FIG. 21 is a perspective view of the end portion of the coaxial cable explaining an outer conductor intertwining step, and FIG. 22 is a perspective view of the end portion of the coaxial cable explaining an outer conductor terminal trimming step.

(Outer Conductor Exposing Step)

An outer conductor exposing step of exposing the outer conductor 14 is performed.

Specifically, the sheath 15 on an end portion of the coaxial cable 10 is cut by a cutter or the like. Then, the sheath 15 located more toward the end than the cut location is pulled out in a direction toward the end. As a result, as shown in FIG. 3, the outer conductor 14 is exposed by a predetermined length.

(Outer Conductor Terminal Widening Step)

An outer conductor terminal widening step for widening a terminal of the outer conductor 14 exposed in the outer conductor exposing step is performed.

In the outer conductor terminal widening step, a gripping jig 21 and a terminal widening jig 71 are used as shown in FIG. 4.

The gripping jig 21 includes a pair of gripping blocks 23 each having a gripping recess 22 of a circular arc shape corresponding to an outer diameter of the sheath 15 formed therein, and grips an end portion of the sheath 15 of the coaxial cable 10 by the gripping recesses 22.

As shown in FIG. 5, the terminal widening jig 71 includes shaping blocks 72 arranged on the left and right sides of the outer conductor 14 of the coaxial cable 10. The shaping blocks 72 each have shaping blades 73 on upper and lower sides thereof, and the upper and lower shaping blades 73 of the left and right shaping blocks 72 are alternately offset from each other along the axial direction of the coaxial cable 10. The shaping blocks 72 are each provided with a pressing groove 74 formed on a side thereof facing the outer conductor 14 by the upper and lower shaping blades 73. Also, the pressing grooves 74 has a straight line portion 74a formed at a bottom part thereof, so that the pressing groove 74 becomes a trapezoid shape. Therefore, in a state in which a terminal-near portion of the outer conductor 14 of the coaxial cable 10 is disposed between the pressing grooves 74 of the shaping blocks 72, when the shaping blocks 72 become close to each other as shown in FIG. 6, a right hexagonal-shaped holding hole A is formed between the shaping blocks 72 as shown in FIG. 7.

In the outer conductor terminal widening step using the gripping jig 21 and the terminal widening jig 71 as described above, as show in FIG. 4, the gripping blocks 23 of the gripping jig 21 become close to each other in a state in which the end portion of the sheath 15 of the coaxial cable 10 is disposed between the gripping blocks 23. As a result, the end portion of the sheath 15 of the coaxial cable 10 is gripped by the gripping recesses 22 of the gripping blocks 23

In this way, in a state in which the end portion of the sheath 15 of the coaxial cable 10 is gripped by the gripping jig 21, as shown in FIG. 6, the shaping blocks 72 are moved toward the outer conductor 14 at a location of approximately 1 mm to 10 mm from the terminal of the outer conductor 14. Then, as shown in FIG. 7, the shaping blocks 72 provided on the left and right sides are intersected such that the shaping blades 73 are engaged with each other, while holding the terminal-near portion of the outer conductor 14 in the pressing grooves 74. Therefore, the shaping blades 73 of the shaping blocks 72 and the straight line portions 74a of the pressing grooves 74 are pressed against the outer conductor 14 held in the pressing grooves 74 from the outer circumference thereof. As a result, the outer conductor 14 around the core member 13 is compressed and bent toward the center thereof at a location pressed by the shaping blades 73 and the straight line portions 74a of the pressing grooves 74.

When the outer conductor 14 is compressed toward the center thereof the shaping blades 73 of the shaping blocks 72 and the straight line portions 74a of the pressing grooves 74, as shown in FIGS. 8A and 8B, the outer conductor 14 located more toward the terminal than the pressed location is widened in an outward radial direction opposite to the pressing direction to be separated from the insulator 12 constituting the core member 13.

In this case, each of the shaping blocks 72 includes the pressing groove 74 having the straight line portion 74a at the bottom part thereof, and thus by allowing the shaping blocks 72 to become close to each other, the right hexagonal-shaped holding hole A is formed between the shaping blocks 72. Also, as the shaping blocks 72 become close to each other, opposing portions of the shaping blades 73 and opposing straight line portions 74a of the pressing grooves 74 become gradually close to each other, so that the holding hole A between the shaping blocks 72 is shrunk. As a result, the shaping blades 73 and the straight line portions 74a of the pressing grooves 74 are contacted with the outer circumference of the outer conductor 14 compressed by the pressing groove 74 of each of the shaping blocks 72 without any gap and substantially uniformly, so that the outer circumference of the outer conductor 14 is uniformly compressed. Therefore, the outer conductor 14 of the coaxial cable 10 is uniformly widened in a concentric circle shape.

If the terminal of the outer conductor 14 is not sufficiently widened even when the outer conductor 14 is shaped by the terminal widening jig 71 in that way, after the shaping blocks 72 are first separated from each other and then are shifted from the compressed location of such a first time in a direction away from the terminal, the shaping blocks 72 are again pressed against the outer conductor 14. Then, the outer conductor 14 is deformed in the outward radial direction at two locations along the axial direction, thereby further widening the terminal of the outer conductor 14.

(Core Mounting Step)

When the outer conductor 14 has been widened at the terminal thereof by the outer conductor terminal widening step as shown in FIG. 9, a cylindrical core 81 formed of, for example, a hard resin or a metal is inserted and mounted onto the terminal portion of the core member 13 as shown in FIG. 10.

(Outer Conductor Releasing Step)

When the core 81 has been mounted on the core member 13, an outer conductor releasing step for unwinding and separating the exposed outer conductor 14 from the core member 13 is performed.

In the outer conductor releasing step, a chuck jig 31 is used as shown in FIG. 11.

As shown in FIG. 12, the chuck jig 31 includes three chuck bodies 32 arranged in equal intervals and the chuck bodies 32 are adapted to move in a radial direction. These chuck bodies 32 each have a pressing recess 33 on the center side of the arrangement thereof, and the chuck jig 31 is provided, at the center of the arrangement of the chuck bodies 32, with an inserting hole 34 surrounded by the pressing recesses 33. The chuck jig 31 is adapted such that the chuck bodies 32 can rotate about the inserting hole 34.

In the outer conductor releasing step using and the chuck jig 31, as shown in FIG. 11, after an end portion of the outer conductor 14 of the coaxial cable 10 has been inserted in the inserting hole 34 of the chuck jig 31, the chuck bodies 32 are moved toward the center of the arrangement thereof. Therefore, the outer conductor 14 is pressed and fixed from an outer circumferential side thereof by the pressing recess 33 of each of the chuck bodies 32.

In this state, as shown in FIG. 13, the chuck bodies 32 of the chuck jig 31 are rotated in a direction opposite to a winding direction of the outer conductor 14 wound in a spiral pattern. Then, the outer conductor 14 is unwound, so that each of wires 14a is loosened and becomes a state inflated away from the core member 13.

In the outer conductor releasing step, as shown in FIGS. 11 and 12, when the outer conductor 14 is pressed from the outer circumferential side thereof by the pressing recess 33 of each of the chuck bodies 32 of the chuck jig 31, the outer conductor 14 is sandwiched and fixed between an outer circumferential surface of the core 81 and the pressing recesses 33 of the chuck bodies 32, thereby eliminating or reducing a pressing load to the core member 13 having the inner conductor 11. Also, in a state in which the outer conductor 14 is fixed by the chuck jig 31, when the chuck bodies 32 are rotated to untwist the outer conductor 14, the core 81 together with the outer conductor 14 is rotated, thereby eliminating or reducing a torsion load to the core member 13 having the inner conductor 11.

A rotation angle θ of the chuck bodies 32 can be calculated from an axial length dimension L (mm) of the exposed outer conductor 14 and a twisting pitch P (mm/rev) of the outer conductor 14 using the following equation.

$$\theta = L/P$$

(Outer Conductor Splitting Step)

An outer conductor splitting step for splitting the outer conductor 14 unwound and separated from the core member 13 is performed.

In the outer conductor splitting step, splitting jigs 41 are used as shown in FIG. 14. The splitting jigs 41 are provided on left and right sides of the end portion of the coaxial cable 10 and are adapted to be moved relative to the coaxial cable 10 in a direction perpendicular to an axial direction thereof. Each of the splitting jigs 41 includes a pair of splitting bodies 43 having a splitting piece 42 protruding toward the coaxial cable 10, and the splitting bodies 43 are adapted to be opened relative to each other in an upward-downward direction.

In the outer conductor splitting step using the splitting jig 41 as described above, as shown in FIG. 14, the splitting jigs 41, of each of which the splitting bodies 43 has been closed relative to each other, become close to the coaxial cable 10, and then the splitting pieces 42 are inserted into the unwound and inflated outer conductor 14.

In this state, as shown in FIG. 15, the splitting bodies 43 of each of the splitting jigs 41 are opened relative to each other in an upward-downward direction and also the chuck bodies 32 of the chuck jig 31 is radially outwardly moved to release fixation of the end portion of the outer conductor 14. Then, the outer conductor 14 is split into two upper and lower groups of wires 14a, gaps S are formed between the groups of wires 14a, and thus the core member 13 is exposed in the gaps S.

(Inner Conductor Extracting Step)

When the outer conductor 14 has been split into two groups of wires 14a, an inner conductor extracting step for extracting the core member 13 having the inner conductor 11 is performed.

In the inner conductor extracting step, an extruding jig 51 is used as shown in FIG. 16. The extruding jig 51 is provided on one side of the end portion of the coaxial cable 10 and is adapted to be moved relative to the coaxial cable 10 in a direction perpendicular to the axial direction thereof. The extruding jig 51 have a holding groove 52 formed on a corner portion of a distal end thereof, which is away from the end portion of the coaxial cable 10, for holding the core member 13 of the coaxial cable 10.

In the inner conductor extracting step using the extruding jig 51 as described above, as shown in FIG. 17, the extruding jig 51 becomes close to the coaxial cable 10 and then is pressed into one gap S formed on the outer conductor 14. Then, the core member 13 is inserted and held in the holding groove 52 of the extruding jig 51 and at the same time, is laterally pressed by the extruding jig 51 to be bent at a portion located toward an end portion of the sheath 15. As a result, the core member 13 having the inner conductor 11 is extruded and extracted out of the outer conductor 14 through the other gap S.

(Outer Conductor Converging Step)

When the core member 13 having the inner conductor 11 has been extracted, an outer conductor converging step for converging the outer conductor 14 is performed.

In the outer conductor converging step, a converging jig 61 is used as shown in FIG. 18. The converging jig 61 includes converging blocks 62 arranged in pairs on each of left and right sides of the outer conductor 14 of the coaxial cable 10. The converging blocks 62 are alternately arranged to be offset in position on the left and right sides of the outer conductor 14 along the axial direction of the coaxial cable 10, and each are adapted to be moved relative to the outer conductor 14 in a direction perpendicular to the axial direction. The converging blocks 62 are each provided with a V-groove 64 on a side thereof facing the outer conductor 14.

In the outer conductor converging step using the converging jig 61 as described above, as shown in FIG. 19, the converging blocks 62 are moved toward the outer conductor 14 in a state in which the core member 13 is oriented upward. Then, the converging blocks 62 provided on the left and right sides are intersected to be overlapped on each other while holding the outer conductor 14 in the V-grooves 63. As a result, the outer conductor 14 held in the V-grooves 63 is sandwiched by the converging blocks 62 and thus is converged on an axis of the coaxial cable 10.

(Outer Conductor Intertwining Step)

An outer conductor intertwining step for intertwining the converged outer conductor 14 is performed.

In the outer conductor intertwining step, the chuck jig 31 as described above is used as shown in FIG. 20. In the outer conductor intertwining step using the chuck jig 31, the chuck bodies 32 are moved toward the center of the arrangement thereof, in a state in which the end portion of the outer conductor 14 of the coaxial cable 10 is inserted in the inserting hole 34 of the chuck jig 31. As a result, the end portion of the outer conductor 14 is pressed and fixed from an outer circumferential side thereof by the pressing recess 33 of each of the chuck bodies 32.

In this state, as shown in FIG. 21, the chuck bodies 32 of the chuck jig 31 are rotated in one direction. Then, the wires 14a of the outer conductor 14 are intertwined.

Preferably, the rotation direction is the same direction as the winding direction of the outer conductor 14 which has been previously wound in a spiral pattern. Also, the rotation number of the chuck bodies 32 can be varied depending on material properties of the wires 14a of the outer conductor 14, but is preferably approximately 2 to 3 revolutions. In addition, when the wires 14a of the outer conductor 14 have been intertwined, the outer conductor 14 is shrunk in the axial direction due to intertwining. Therefore, the chuck jig 31 is adapted to be moved along the axial direction of the coaxial cable 10, and during the outer conductor intertwining step, the chuck jig 31 is moved in the axial direction corresponding to the outer conductor 14 shrunk due to intertwining.

(Outer Conductor Terminal Trimming step)

As shown in FIG. 22, an outer conductor terminal trimming step, in which the terminal portion of the outer conductor 14 fixed by the chuck jig 31 and thus having a chuck mark formed thereon is cut and removed by a cutter or the like, is performed.

By performing the foregoing steps, the core member 13, which includes the inner conductor 11, and the outer conductor 14 of the end portion of the coaxial cable 10 are branched from each other, and thus each become a state of capable of connecting to a connector or the like.

In this way, according to the terminal treatment method and the terminal treatment apparatus for the present embodiment, the terminal-near portion of the outer conductor 14 is deformed by compression from the outer circumferential side thereof by the terminal widening jig 71 so that the terminal portion of the outer conductor 14 can be widened away from the core member 13. Therefore, enhancement of workability of subsequent treatments for the coaxial cable 10 can be achieved.

For example, by widening the terminal of the outer conductor 14 of the coaxial cable 10 in a concentric circle shape, workability of the core mounting step for protecting the core member 13 having the inner conductor 11 can be enhanced and also the outer conductor 14 can be evenly untwisted in the outer conductor releasing step, thereby achieving enhancement of quality.

Also, as the shaping blocks 72 become close to each other, the right hexagonal-shaped holding hole A formed by the pressing grooves 74 is shrunk. Thus, when the terminal-near portion of the outer conductor 14 is disposed in the holding hole A, the outer circumference of the terminal-near portion of the outer conductor 14 can be substantially uniformly compressed so that the end portion of the outer conductor 14 can be uniformly widened in a concentric circle shape. Therefore, workability of subsequent treatments for the coaxial cable 10 can be further enhanced.

In addition, although the foregoing embodiment has been described, by way of example, with respect to a case in which the shaping blocks 72 of the terminal widening jig 71 become close to each other, thereby forming the holding hole A having a right hexagonal shape, the shape of the holding hole A may be a right octagonal shape.

Also, according to the foregoing embodiment, during the outer conductor releasing step, the outer conductor 14 is rotated in a direction opposite to the winding direction of the outer conductor 14 wound in a spiral pattern to be loosened. However, in a case of a coaxial cable 10 having an outer conductor 14 attached in a longitudinal direction thereof, the end portion of the outer conductor 14 is gripped by the chuck jig 31 and then the chuck jig 31 is moved in the axial direction away from the end portion, thereby loosening the outer conductor 14.

Herein, to illustrate further advantages of the present invention, reference examples of a terminal widening jig will be described.

REFERENCE EXAMPLE 1

Figure 23A:
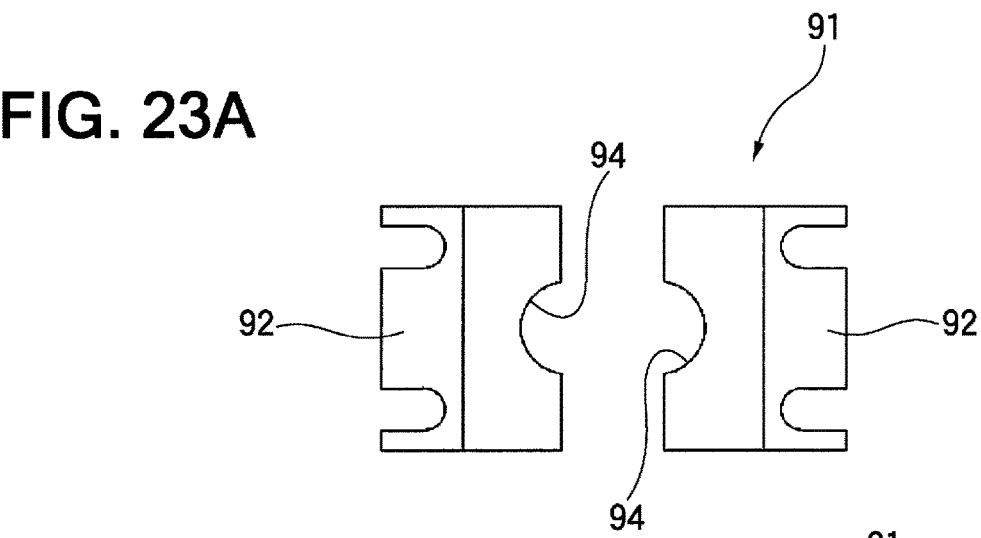
FIGS. 23A and 23B each are front views showing a terminal widening jig according to a reference example 1.
Figure 23B:
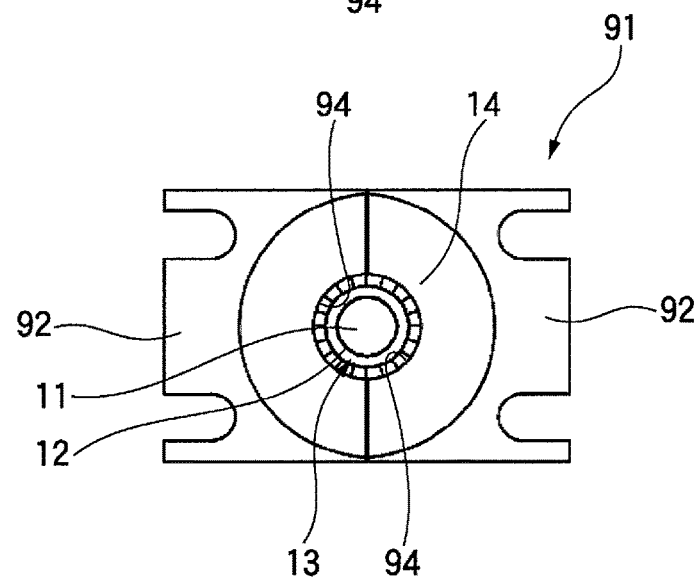

FIGS. 23A and 23B each are front views showing a terminal widening jig according to a reference example 1.

As shown in FIG. 23A, the terminal widening jig 91 of the reference example 1 includes shaping blocks 92 each provided with a U-groove 94 for compressing the outer conductor 14 of the coaxial cable 10.

As shown in FIG. 23B, if the shaping blocks 92 of the terminal widening jig 91 become close to each other with the outer conductor 14 of the coaxial cable 10 held in the grooves 94, bottoms of the grooves 94 become close to each other to compress the outer conductor 14. However, even when the shaping blocks 92 become further close to each other, a pressing force to a portion of the outer conductor 14 located near edges of the grooves 94 is not increased, and thus compressing forces on upper and lower portions of the outer conductor 14 are insufficient. As a result, the outer conductor 14 is not uniformly compressed in a circumferential direction thereof, thereby causing a variation in widening of the terminal of the outer conductor 14.

REFERENCE EXAMPLE 2

Figure 24A:
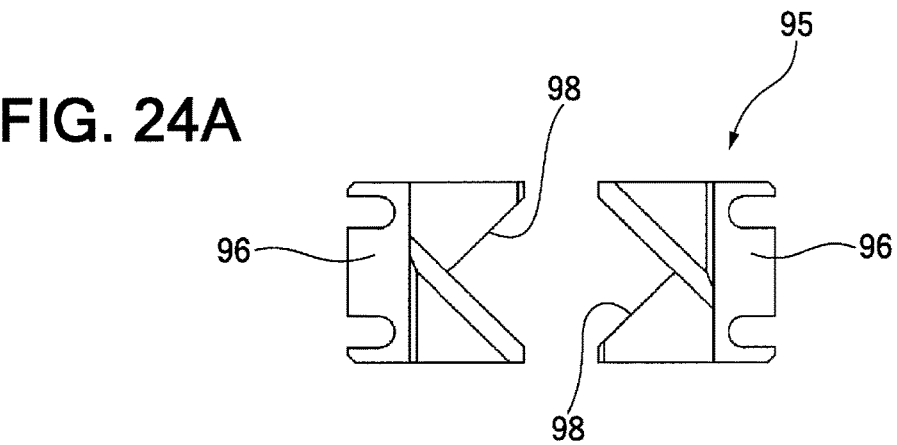
FIGS. 24A and 24B each are front views showing a terminal widening jig according to a reference example 2.
Figure 24B:
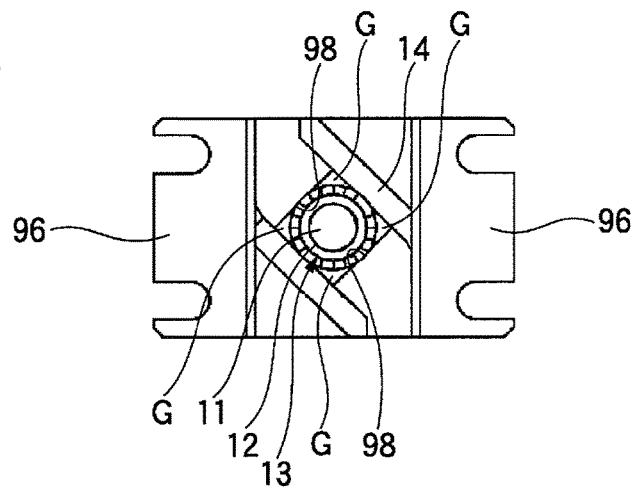

FIGS. 24A and 24B each are front views showing a terminal widening jig according to a reference example 2.

As shown in FIG. 24A, the terminal widening jig 95 of the reference example 2 includes shaping blocks 96 each provided with a V-groove 98 for compressing the outer conductor 14 of the coaxial cable 10.

As shown in FIG. 24B, if the shaping blocks 96 of the terminal widening jig 95 become close to each other with the outer conductor 14 of the coaxial cable 10 held in the grooves 98, the grooves 94 compress the outer conductor 14. However, spaces G are created in valley portions of the grooves 98 and portions engaged between the grooves 98 of the shaping blocks 96, and thus compressing forces in the spaces G are insufficient. As a result, the outer conductor 14 is not uniformly compressed in a circumferential direction thereof, thereby causing a variation in widening of the terminal of the outer conductor 14.

The present invention is not limited to the foregoing embodiment, but appropriate changes, modifications or the like thereof can be made. In addition, material, shape, dimension, number, installation location and the like of each of the components of the foregoing embodiment are not limited but arbitrary if the present invention can be achieved.

What is claimed is:

1. A terminal treatment apparatus for a coaxial cable including a core member having an inner conductor covered with an insulator, an outer conductor provided around the core member and formed of a plurality of wires, and a sheath covering an outer circumference of the outer conductor, the terminal treatment apparatus comprising:

a terminal widening jig that widens a terminal of the outer conductor away from the core member by compressing a terminal-near portion of the exposed outer conductor from an outer circumferential side of the coaxial cable to deform the terminal-near portion of the exposed outer conductor, wherein the terminal widening jib includes:

a pair of shaping blocks that separably contact each other, each shaping block including a groove formed on a side facing the other shaping block, wherein, when the shaping blocks are disposed around and in contact with the outer conductor, a holding hole of a right hexagonal shape or a right octagonal shape is formed by the grooves, and when the terminal-near portion of the outer conductor is disposed in the holding hole and then shaping blocks are close to each other, the holding hole compresses the terminal-near portion of the outer conductor and the outer conductor is widened away from the core member.

2. The terminal treatment apparatus according to claim 1, wherein an upper surface and a lower surface of the shaping blocks each include a shaping blade, the pressing groove being formed on each of the shaping blade.

\* \* \* \* \*